Sept. 28, 1926.

A. L. LONG 1,601,573

COMBINED VEHICLE DIRECTION INDICATOR AND TAIL LIGHT

Filed Feb. 1, 1923    2 Sheets-Sheet 1

Avis L. Long,
Inventor

Witnesses:

Attorney

Sept. 28, 1926.  
A. L. LONG  
1,601,573  
COMBINED VEHICLE DIRECTION INDICATOR AND TAIL LIGHT  
Filed Feb. 1, 1923   2 Sheets-Sheet 2
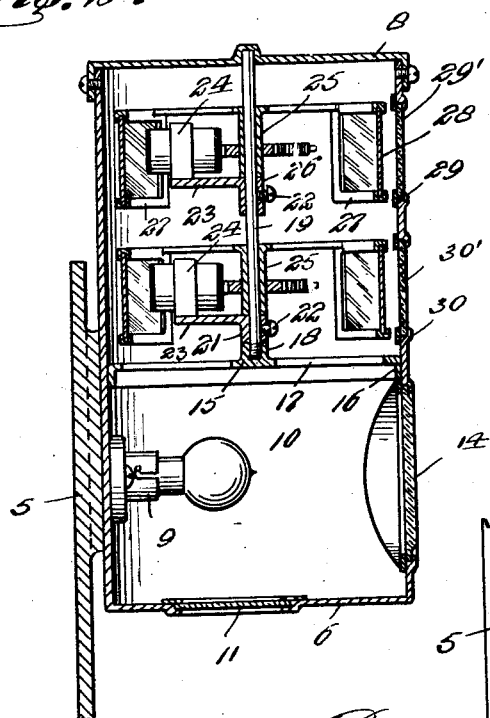
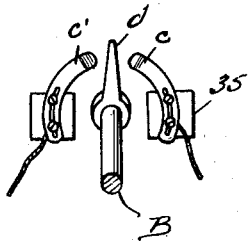
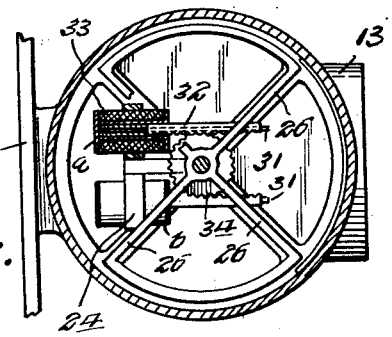
Avis L. Long,  
Inventor
Witnesses:  
Attorney Patented Sept. 28, 1926.

1,601,573

UNITED STATES PATENT OFFICE.

AVIS L. LONG, OF WASHINGTON, DISTRICT OF COLUMBIA.

COMBINED VEHICLE DIRECTION INDICATOR AND TAIL LIGHT.

Application filed February 1, 1923. Serial No. 616,267.

My invention relates to combined indicator and tail lights for motor vehicles, and the primary object thereof resides in the provision of such a device that is of substantially simple construction, comparatively inexpensive of manufacture, and of such a nature as to be readily positioned at a convenient point, preferably at the rear end of a motor vehicle.

A further object of my invention is the provision of such a combined device that is automatic in its nature, the several indicating members thereof being electrically controlled by the speed of the vehicle as well as the steering of the same.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 2 is a vertical transverse cross sectional view of the device shown in Figure 1.

Figure 1:
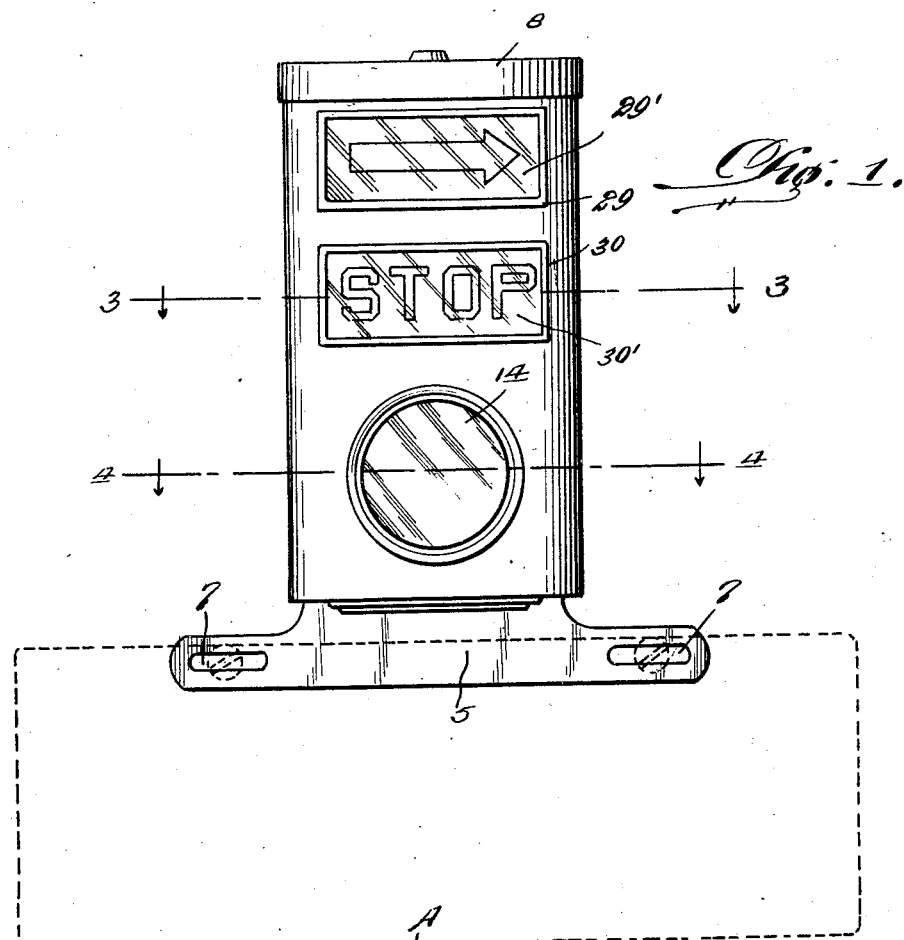
Figure 1 is a front elevational view of a device constructed in accordance with my invention.

Figures 3 and 4 are transverse cross sectional views upon the lines 3—3 and 4—4, respectively, of Figure 1, and looking in a downward direction of the arrow.

Figure 5:
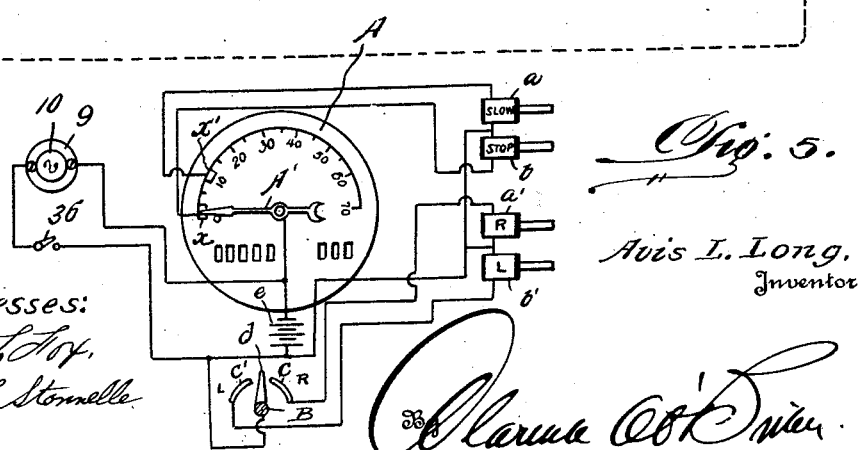

Figure 5 is a diagrammatic view of a wiring system of my invention, and

Figure 6 is a plan view of a specific form of two-way switch member also employed in conjunction with this invention.

Referring to the drawings in detail, the device constitutes the provision of a bracket 5 in the form of a plate member, to which is suitably secured a casing 6 of elongated cylindrical form, and extending vertically with said bracket 5. The lower end of this bracket 5 is formed at the opposite ends thereof with slots 7, whereby a license plate may be secured thereto.

The cylindrical casing 6 is open at its upper end and has a removable cap 8 disposed thereon. Within said casing 6, and adjacent the bottom wall thereof is a lamp receiving socket 9, within which is an electric bulb 10. The bottom wall of the casing is formed with an opening of substantially rectangular shape, and within this opening, there is removably positioned a glass panel 11, which is preferably of clear glass, and is for the purpose of permitting the light rays from the bulb 10 to illuminate the license tag supported upon the end of the bracket 5.

Directly forwardly of the bulb 10, the casing 6 is formed with an opening 12 and surrounding said opening and integral with the casing 6 is a flange 13, the outer end of which is adapted for the reception of a bull's-eye lens, the color of the same being preferably red, and adapted for the provision of a tail-light for the motor vehicle when the bulb 10 is illuminated.

Within the casing 6 and above the bulb 10 as well as the opening 12 therein, there is secured in any manner desirable, a supporting frame 15, which is preferably in the form of a flanged ring 16, and integral cross arms 17. The top surface of this frame 15 is centrally formed with a projecting knob or abutment 18 having a screw threaded opening therein for the reception of the screw threaded end of a vertically disposed rod 19. Surrounding this rod 19 and at spaced points thereon is an upper and lower sleeve member 20 and 21 respectively, each of the same being held against rotation upon the rod through the instrumentality of set screws 22. Formed upon the upper end of each of said sleeves is a rearwardly extending arm 23, each of which is adapted for the support of a pair of electromagnets, the magnets supported upon the upper arm designated as $a$ and $b$, and those upon the lower arm $a'$ and $b'$, respectively. The securing means between said magnets and arms 23 may be and preferably is, in the form of strap members 24.

In face to face contact with the upper end of each sleeve member 20 and 21 respectively are relatively elongated collars 25, each of the same being freely rotatable upon the rod 19. The upper ends of each of these collars are formed with radially extending arms 26, and upon the outer ends of adjacent arms are pendant arcuate-shaped open frame members 27, and within these frame members are positioned arcuate shaped strips of glass 28.

The strips of glass 28 in the upper pair of frame members 27 have preferably formed thereon the words "Slow" and "Stop" respectively, while the strips of glass in the bottom pair of frame members are formed with arrows thereon, each of the same pointing in opposite directions for indicating a right or left hand turn, and said casing 6 above the opening 12 therein and directly forwardly of each pair of signal members, is formed with an upper and lower opening of substantially rectangular shape and designated 29 and 30 respectively. Positioned between these openings are plates of clear glass 29′ and 30′ respectively, for the purpose of permitting the signal members within the casing to be reviewed exteriorly thereof.

Within each of the said magnets and projecting outwardly a distance therefrom is a brass rod 31 and sliding over each of these rods and adapted to be attracted by each of the said magnets are tubular cores 32, the inner surface of each being racked as more clearly shown in Figures 2 and 3. These cores 32 are normally forced outwardly of the said magnets to a position as shown in Figure 3, through the instrumentality of relatively small coiled springs 33. The racked surfaces of each pair of cores have mesh with pinion gears 34 formed upon each of the before mentioned sleeve members 35.

In the wiring diagram of Figure 5, there is shown the face of a motor vehicle speedometer A and at two points upon this face, preferably at the 0 and 10 point are contacts $x$ and $x'$ respectively, the said contact $x$ having electrical connection with the said magnet $b$ of lower pairs of magnets, while the contact $x'$ has similar connection with the magnet $a$ of the same pair. Also, in this diagrammatic view, there is shown a pair of spaced spring contact members $c$ and $c'$, the same adapted to be selectively engaged by a swinging contact arm $d$.

As more clearly shown in Figure 6, these spring contacts $c$ and $c'$ are in the form of arcuate strips of metal adjustably supported upon blocks of wood or other non-conducting material 35, which blocks of wood are in turn supported at the lower end of the usual steering column B of the motor vehicle. The said swinging contact arm $d$ is in turn connected to the lower end of this steering column, and is adapted for contact with said spring contacts $c$ and $c'$ respectively, when the vehicle is turned to either the right or left. The hand of the speedometer A′ as well as the steering column B of the vehicle has electrical connection with the opposite poles of a source of electrical energy $e$, which may be and preferably is, the usual storage battery of a motor vehicle. The spring contact $c$ is electrically connected with the magnet $a'$ of the upper pair of magnets, while the contact $c'$ is in turn electrically connected with the magnet $b'$ of the same pair. The opposite terminals of the lamp socket 9 are in circuit with the said battery $e$, and the circuit to the bulb 10 within this socket may be made and broken by a desirable form of switch 36 positioned upon the vehicle in convenient reach of the driver.

In view of the above description, it will at once be apparent that should the speed of the vehicle upon which my device is installed be approximately ten miles an hour, the circuit will be completed between the storage battery $e$ and the electromagnet $a$ of the lower pair of magnets. Upon energization of this magnet, the core 32 will be attracted thereby, and the same upon moving inwardly will consequently rotate the lower signal member for bringing to view through the glass panel 29′ of the casing, the indicating plate having the word "Slow" formed thereon. As soon as this circuit is broken the core 32 will be forced outwardly from the magnet through the instrumentality of its coiled spring 33 for consequently rotating the signal member in a reverse direction. When a machine has been brought to a stop, the hand A′ of the speedometer will engage the contact $x$ for consequently completing the circuit to the magnet $b$ for rotating the lower signal member and consequently bringing to view the plate having formed thereon, the word "Stop." Should the driver of the vehicle turn his machine to either the right or to the left, the contact arm $d$ upon the steering post B will engage either one of the spring contacts $c$ or $c'$ for completing the circuit to either of the magnets $a'$ or $b'$ of the upper signal member for consequently bringing to view through the glass panel 29′ of the casing, one or other of the signal plates within the upper signal member. When the switch 36 is closed, the circuit will be made to the bulb 10 for permitting my device to effectively function as a tail-light for the vehicle, as well as for illuminating the license tag carried by the lower end of the bracket 5, and in view of the above description, the advantages and operation of a device of this character will be readily appreciated by those skilled in the art, and while I have herein shown and described the preferred embodiments of the present invention, it is nevertheless to be understood that minor changes may be made therein, without departing from the spirit and scope of the invention as claimed.

Having thus described the present invention, what I claim as new and desire to secure by Letters Patent is:—

1. In a structure of the class described, a vertically elongated open top casing, a spider frame supported centrally in said casing and provided with a central upstanding socket, a vertical shaft having a threaded end tapped into said socket, a removable cover for the top of said casing, said cover being formed with a central depression receiving the upper end of said shaft, a sleeve surrounding said shaft, said sleeve being provided with a horizontal magnet supporting arm, means for fixedly connecting said sleeve with said shaft, a second sleeve surrounding the shaft and abutting the first-named sleeve, an arm radiating from said second sleeve, an arcuate frame carried by the outer end of said radiating arm, a transparent plate carried by said frame, said casing being formed with an opening with which said arcuate frame and plate are adapted to co-act, a magnet supported on the first-named arm, and means whereby the magnet may actuate the signal.

2. In a structure of the class described, a vertically elongated open top casing, a spider frame supported centrally in said casing and provided with a central upstanding socket, a vertical shaft having a threaded end tapped into said socket, a removable cover for the top of said casing, said cover being formed with a central depression receiving the upper end of said shaft, a sleeve surrounding said shaft, said sleeve being provided with a horizontal magnet supporting arm, means for fixedly connecting said sleeve with said shaft, a second sleeve surrounding the shaft and abutting the first-named sleeve, an arm radiating from said second sleeve, an arcuate frame carried by the outer end of said arm, a transparent plate carried by said frame, said casing being formed with an opening with which said arcuate frame and plate are adapted to co-act, a magnet supported on the first-named arm, and rack and pinion means associated in the magnet and second named sleeve for imparting rotation to the latter.

In testimony whereof I affix my signature.

AVIS L. LONG.